United States Patent Office 3,490,277
Patented Jan. 20, 1970

3,490,277
TIRE TESTING SYSTEM
James W. Sanders, Muskegon, Mich., and James T. Maguire, Neptune, N.J., assignors to Electronic Associates, Inc., West Long Branch, N.J., a corporation of New Jersey
Filed Aug. 17, 1967, Ser. No. 661,243
Int. Cl. B60c *19/10;* G01m *17/02*
U.S. Cl. 73—146                                4 Claims

ABSTRACT OF THE DISCLOSURE

A tire testing system is provided to sense and calculate particular desired harmonics and corresponding phase angles of applied force variations of a rotating tire resulting from non-uniformities thereof. The particular calculating circuits are in the form of closed-loop sine-wave oscillators involving two analog integrators and an inverter. The first loop calculates the particular harmonic components during one revolution of the tire and signals representing these components are supplied as initial condition signals to the integrators of the second loop which calculates the harmonic amplitude and phase angle.

---

This invention relates to improved means for measuring the nonuniformity of an automobile tire and more particularly to such means adapted to determine the harmonic components and phase angles of such nonuniformity.

Many different methods have been devised in the past to determine eccentricities or nonuniformities of tires and the like that tend to cause unwanted vibrations while the tire and the rim to which it is mounted is rotating. Such methods include the use of stroboscopic action to detect linear displacement of such a rotating tire. Other means include the measurement of variations and the load or force applied to a rotating tire such as by a "road wheel" which is used to apply a load to the tire. Such latter methods have employed the treatment of a generated force variation signal in accordance with standard methods of Fourier analysis to determine the amplitude of the principle harmonic of the signal, which is a periodic signal, and to determine the particular angle at which the principal component reaches the maximum, which angle and amplitude are criteria of the nonuniformity of the tire. These latter methods are adapted for the employment of analog computing elements to perform the various multiplications and integration as required by the Fourier analysis. In the past elaborate means have been employed to achieve more precise calculations of the particular functions. However, although such means have become more elaborate, they have not necessarily become more sophisticated and have involved an increasing number of components with an increase in the cost of the respective system. This cost becomes increasingly important as the need for additional such systems increases to provide installations for commercial measurement of tire nonuniformity in such places as gasoline stations, garages and other places where tires are sold or in tire manufacturing plants.

It is, then, an object of the present invention to provide an improved means for measuring tire uniformity.

It is another object of the present invention to provide an improved means for measuring the amplitudes of the harmonic components and the phase angle associated with each harmonic of a rotating tire.

It is still another object of the present invention to provide an improved analog computing system for the measurement of the harmonic components and phase angles of tire uniformity.

It is still a further object of the present invention to provide an analog computing system for determining Fourier coefficients which are applicable to the measurement of tire uniformity.

In the measurement of tire nonuniformity, the harmonic content of a force variation signal may be represented in the form of the following general Fourier expansion:

(1)
$$f(t) = \frac{A_0}{2} + \sum_{\eta=1}^{\infty} (A_\eta \cos \eta \omega t + B_\eta \sin \eta \omega t)$$

The various harmonic coefficient values contained in the above equation are defined according to the following equations:

(2)
$$A_\eta = \frac{2}{T} \int_0^T f(t) \cos \eta \omega t \, dt$$

(3)
$$B_\eta = \frac{2}{T} \int_0^T f(t) \cos \eta \omega t \, dt$$

Any harmonic component of the force variation may then be expressed as (4)
$$C_\eta \cos(\eta \omega t - \varphi_\eta)$$

$C_n$ is the magnitude of the $n$th harmonic component and $\varphi_\eta$ is the corresponding phase angle where (5)
$$\phi_\eta = \tan^{-1}\left(-\frac{B_\eta}{A_\eta}\right)$$

and where (6)
$$C_\eta = \sqrt{A_\eta^2 + B_\eta^2}$$

It will be recognized from a review of the above equations that analog computing elements can be connected in a circuit to mechanize these equations. However, it will be appreciated that, for example, such circuitry would normally employ a number of multiplying elements to achieve the various products that are the integrands of the particular integrals.

A particular method of eliminating the need for multiplying computing elements has been devised which employs two integrating elements and an inverter in a feedback relation to form a closed-loop sine-wave oscillator. With this scheme, a closed-loop sine-wave generator of this type is employed to calculate the respective principal coefficients during the first revolution of the tire under load. These respective coefficients are then introduced as initial values into a second closed-loop sine-wave generator so as to produce, during the second cycle of computation, an output from one of the integrators which is the required principal component. This component will be a maximum when the input to that integrator is zero. Means also may be provided to determine when the input into the integrator is zero, from which condition the phase angle may be determined.

A feature then in the present invention resides in an analog computing circuitry adapted to receive an input signal representative of the force variation of an automobile tire in rotation under a driving load. This circuitry includes a first closed-loop sine-wave generating circuit including two integrating amplifiers and an inverter amplifier with the output signals of each integrator being representative of particular desired Fourier coefficients ($A_n$ and $B_n$), which outputs are supplied as initial conditions to the respective integrating amplifiers of a second closed-loop sine-wave oscillator at the end of the first revolution of the tire under load. The output signal of one of the second integrators is representative of the harmonic amplitude of the tire force variation which is being measured.

Means are also provided to determine when the input to the output integrating amplifier is zero from which condition the phase angle can be determined.

These and other objects and advantages are features of the present invention which will become more readily apparent from a review of the following specification when taken in conjunction with the drawings herein:

In order to provide a better understanding of the environment in which the present invention resides, a description will first be given of the manner in which the tire to be tested is mounted and placed under a load force and from which signals are received as the tire is rotated. A tire is first mounted on a rim and inflated to a desired pressure. The rim is rotated at a particular desired rotational speed by suitable means attached to the axle of the rim. A road wheel is moved into contact with the tire compressing it to a preset load or deflection. Load cells of a type known in the art are attached to the road wheel mounting to generate voltage signals which are proportional to the force variations of the tire in the lateral and radial directions with respect thereto. It will be appreciated that such variations caused by the nonuniformity of the tire will have, as its fundamental harmonic component, signal variations of the same frequency as the tire rotation due to the cyclic nature thereof.

Figure 1:
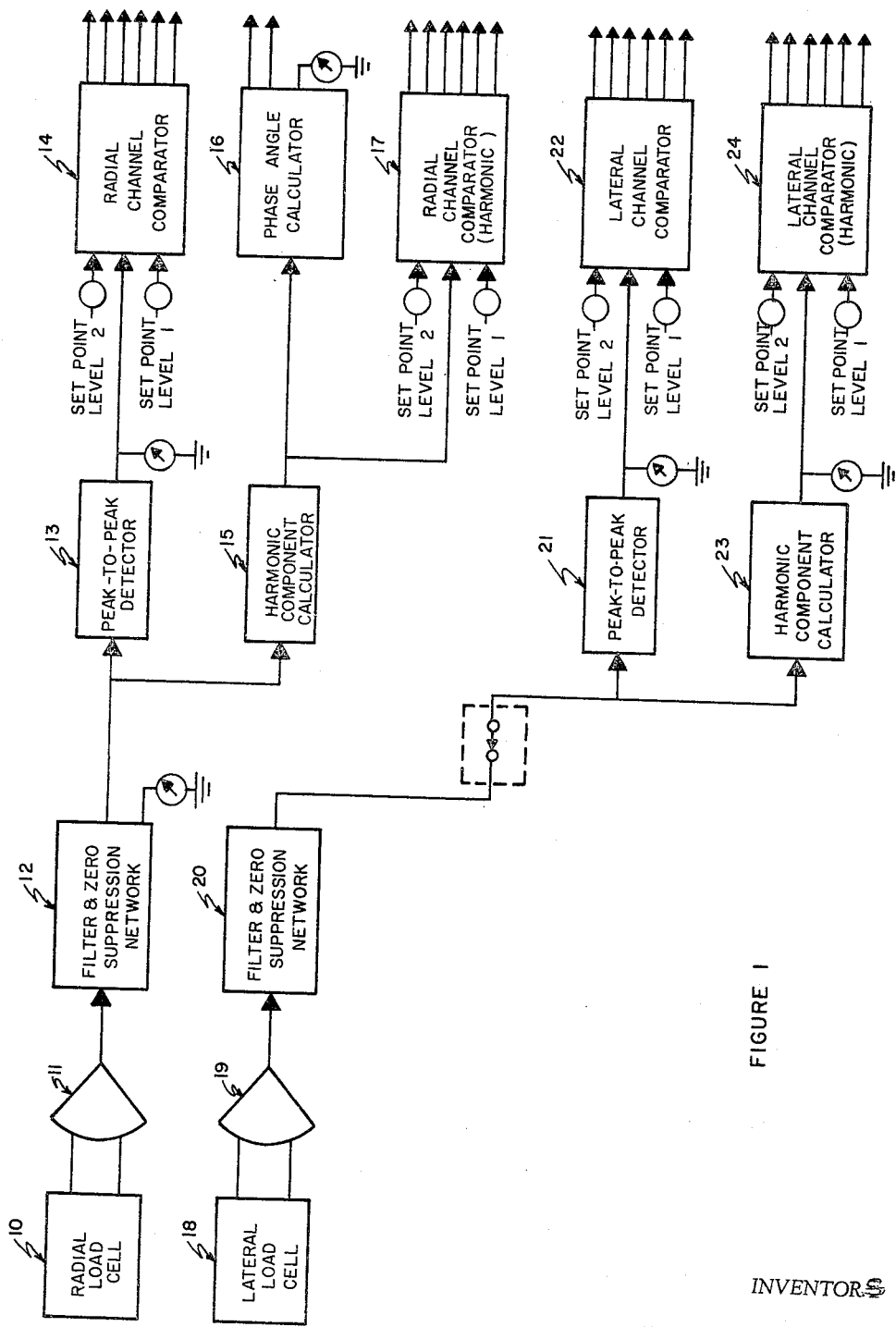
FIGURE 1 is a schematic diagram of the tire uniformity measurement circuitry of the present invention.

Referring now to FIGURE 1, there is shown therein a schematic diagram of the circuitry for detecting and calculating the harmonic components and phase angle of each harmonic of the nonuniformity of a tire under test. As a tire is being rotated under load from the road wheel, a transducer of the radial load cell 10 generates signals proportional to the radial variation of the road wheel which signals are amplified by preamplifier 11 with amplified signals being supplied by way of filter network 12 to peak-to-peak detector 13 and also to the fundamental component calculator 15. Peak-to-peak detector 13 provides output signals for comparison with preset high and low voltage levels by radial channel comparator 14 while harmonic component calculator 15 provides as output signals the respective coefficient values for the particular harmonic as expressed in Equations 2 and 3 above. With these signals, phase angle calculator 16 then calculates the magnitude of the harmonic component and phase angle in accordance with Equation 4 above where the subscript $n$ is an integer. For $n=1$, the system would calculate the fundamental component (first harmonic) and the phase angle associated with the fundamental component. The manner in which such calculations are performed in accordance with the present invention are more thoroughly described below.

In addition to the radial component, the lateral component is calculated from signals generated by the transducer of lateral load cell 18 of FIGURE 1 in a manner similar to generation of the radial signals. Similarly, the signals representing lateral variations are amplified by preamplifier 19 with the amplified signals being passed through filter network 20 to peak-to-peak detector 21 and the harmonic component calculator 23. The functions of lateral channel comparators 22 and 24 are similar to those of the radial channel comparators 14 and 17.

Figure 2:
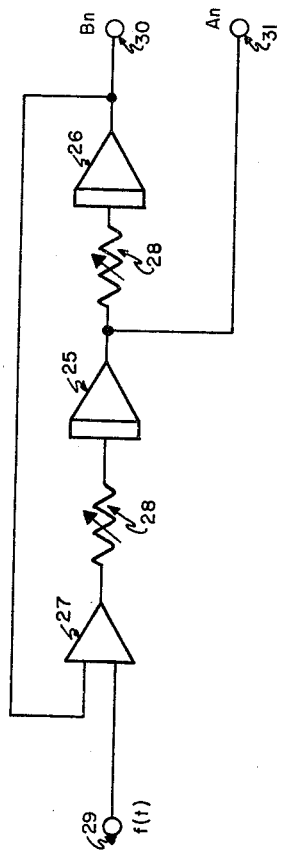
FIGURE 2 is a schematic diagram of one of the closed-loop sine-wave oscillators employed in the present invention.

Referring now to FIGURE 2, there is shown therein the basic calculation circuitry to be employed in the harmonic component calculators 15 and 23. Basically, the circuit of FIGURE 2 includes a three amplifier loop arranged in a closed-loop sine-wave oscillator configuration and includes integrating circuits 25 and 26 where the output of integrator 26 is coupled by way of inverter 27 back to the input of integrator 25. The circuit is adjusted by way of variable resistances 28 to oscillate at the desired frequency. For the fundamental component, the circuit is set to oscillate at the same frequency as the rotating tire under test. For the second harmonic component, the frequency of the circuit is set to a value equal to twice the tire rotational speed. For the third harmonic, the setting is three times the tire rotational speed. This relationship holds for subsequent harmonic components to be calculated. The output signal from the respective load cell is supplied to the circuit by way of input terminal 29 from which that signal is summed together with the feedback signal to inverter 27. When the circuit is adapted to oscillate at the same frequency as the rotating tire, the respective output signals from the circuit will be representative of the fundamental or first harmonic component (that is to say, the integer $n$ of Equations 1–6 above will just be equal to 1). The particular circuit of FIGURE 2 is disclosed and described in the text Computer Handbook, Huskey & Korn, McGraw-Hill Book Company, 1962, pages 6–54 to 6–56. As described therein, the signal obtained at terminal 30 of FIGURE 2 will be equal to the coefficient $A_n$ in accordance with Equation 2 above and the signal obtained at terminal 31 will be equal to the coefficient $B_n$ in accordance with Equation 3 above after one complete cycle or one complete revolution of the tire under test.

Figure 3:
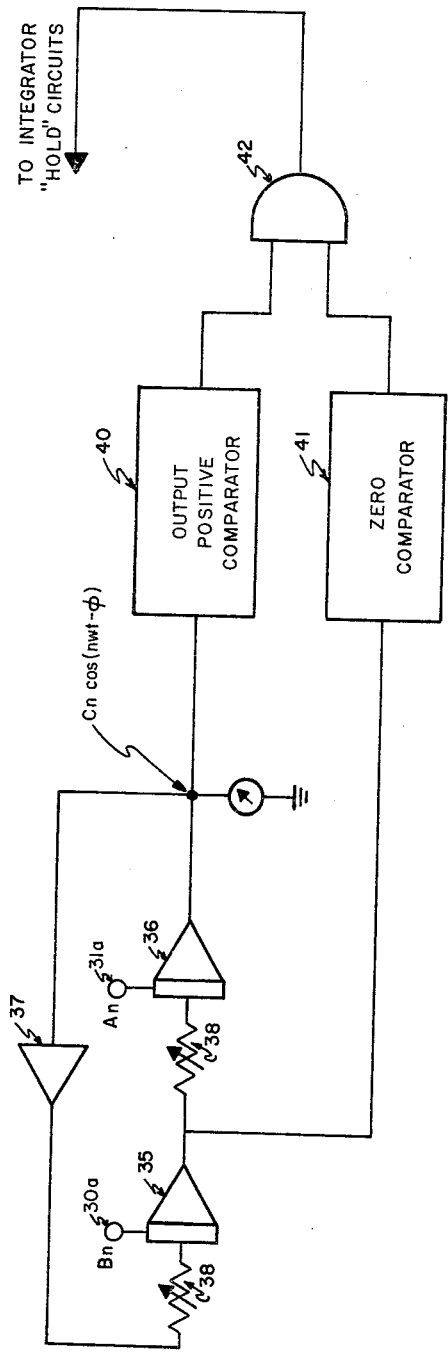
FIGURE 3 is a schematic diagram of another closed-loop sine-wave oscillator as employed in the present invention.

At the beginning of the second cycle of rotation of the tire, the signals from terminals 30 and 31 of FIGURE 2 are supplied in correct polarity to corresponding terminals 30a and 31a of FIGURE 3 as initial condition values for the respective integrators 35 and 36 which are connected in a circuit with inverter 37 to also form a closed-loop sine-wave oscillator, the frequency of which is adjusted by way of variable resistances 38 to be the same as that of the circuit of FIGURE 2. The output signal from integrator 36 will be representative of the expression of Equation 4 above and will be representative of the harmonic component $C_n$ when the cosine term of Equation 4 is equal to 1. Since the output signal of integrator 35 will contain as a factor, the sine function corresponding to the cosine function of the output of integrator 36, that cosine function will be a maximum or 1 when the sine function and thus the output signal from integrator 35 is zero. Thus when the output of integrator 36 is positive and this condition is detected by comparator 40 of FIGURE 3 and the output signal from integrator 35 is zero which condition is detected by comparator 41, the output signals from the respective comparators 40 and 41 are supplied to AND gate 42 to generate a signal to place integrators 35 and 36 in a "HOLD" condition and also to mark the rotating tire at its point of maximum nonuniformity. The output signal of integrator 36, which is now in "HOLD" mode, will be representative of the maximum value of the harmonic component $C_n$ and the value of the phase angle $\phi_n$ may be determined by connecting an integrator circuit to generate a ramp signal at a time-constant equal to the time required for one tire revolution. This integrator is placed in a "HOLD" condition at the same time that integrator 36 is placed in a "HOLD" condition so that the output value can be read out at a later time.

As thus described, the circuitry of FIGURE 2 is representative of the component calculators 15 and 23 of FIGURE 1 and the circuitry of FIGURE 3 is representative of the phase angle calculator 16 of FIGURE 1.

With the circuitry thus described, a tire may be quickly tested to determine its point of maximum nonuniformity by mounting the tire on a rim, inflating the tire and preloading it to a desired level. A measurement cycle is conducted during one complete tire revolution. At the end of this revolution, the $A_n$ and $B_n$ values of the harmonic component of the radial load variation signal are obtained. Signals representing these values are connected to the integrators of FIGURE 3 as initial condition values and the circuit of FIGURE 3 is placed in an "operate" mode at the beginning of the second tire revolution. The attenuators 28 and 38 of FIGURES 2 and 3 are to have been set so that the respective closed loops oscillate at the desired frequency. When the maximum value of the harmonic component $C_n$ has been obtained, this condition is sensed by appropriate comparators to place the respective integrators in a "HOLD" mode and also to activate a marking device which marks the tire at the point at which the most positive value of the harmonic component has occurred. The test is stopped when that angle is found, the road wheel is retracted, the tire is deflated and unchucked in preparation for the next test.

The tire has now been marked at a spot on the tire where the first harmonic signal has reached its most positive value so that it can be mated to a rim which has also been tested in a like manner. The point of most positive value of the fundamental component for the rim is located 180° away from the point of most positive value of the fundamental component for the tire.

Similar measurements for lateral displacements will employ the circuitry of FIGURES 2 and 3 with the exception that it will not be necessary to obtain a phase angle displacement measurement.

It will be understood that higher harmonics of the respective signals can be obtained by adjusting the attenuators 28 and 38 of FIGURES 2 and 3 so that the respective closed-loop oscillators oscillate at corresponding harmonics of the fundamental frequency. In the case of higher harmonics, the peak value of any harmonic variation will occur more than once during one tire revolution. For the second harmonic, the peak value will occur twice with a second peak being 180° away from the first. The third harmonic will have three peak values occurring 120° apart. The number of peak values and their location for the remaining harmonics can be determined in a similar manner.

It should be pointed out that a repeat measurement of the fundamental signal on the same tire does not depend on the tire being oriented at the same starting point. A different starting point will result in a different phase angle measurement, but the tire will be marked at the same spot as the first measurement.

It should also be pointed out that the system can be arranged to detect the most negative value of the harmonic component. This is implemented by arranging comparator 40 to detect a negative output from integrator 36 rather than a positive output as shown in FIGURE 3. In this arrangement, the phase angle indication will be displaced by 180°. The detection and location of the most negative value of the harmonic component on the tire is applicable where the mark indicating the most positive value on the rim is matched with the mark showing the most negative value on the tire. It also is advantageous where the tire phase angle marking device cannot be located at the point where the road wheel contacts the tire. By positioning the marking device 180° from the road wheel, the most negative value of the harmonic component can be computed, but the point at which the most positive value of the harmonic occurs is actually marked on the tire.

While but one embodiment of the present invention has been described and illustrated, it will be apparent to one skilled in the art that modifications and changes may be made which will nevertheless be within the spirit and scope of the invention.

What is claimed is:

1. In a tire testing system having a load cell mounted with respect to a rotating tire to generate a signal proportional to force variations of an applied load, circuitry comprising:

a first closed-loop sine-wave oscillator including two integrating circuits in series and an inverter circuit coupling the output of the second integrating circuit to the input of said first integrating circuit, said first oscillator being connected to receive said generated signal and to supply, as outputs, two signals each of which is representative of a harmonic coefficient of said generated signal; and a second closed-loop sine-wave oscillator including two integrating circuits in series and an inverter circuit coupling the output of the second integrating circuit to the input of said first integrating circuit, the two integrating circuits of said second oscillator being connected to said first oscillator to receive respective ones of said output signals as initial values so as to generate as an output of said second oscillator, two signals each representative of a harmonic component of said generated signal.

2. A circuit according to claim 1 wherein each of said oscillators includes a variable resistance in circuit to adjust the frequency of oscillation of said oscillators to a given desired harmonic of the rotational frequency of the rotating tire.

3. A circuit according to claim 1 including means to determine when one of the output signals of said second oscillator is zero such that the other output signal of said second oscillator represents the maximum amplitude of said harmonic component.

4. A circuit according to claim 1 including means to activate said first oscillator during one rotation of said rotating tire and to activate said second oscillator during the next succeeding rotation of said tire.

References Cited

UNITED STATES PATENTS 3,060,734 10/1962 Obarski et al. _____ 73—146
3,375,714 4/1968 Bottasso _____ 73—146

DONALD O. WOODIEL, Primary Examiner